United States Patent
van der Bogert et al.

(10) Patent No.: US 7,941,861 B2
(45) Date of Patent: May 10, 2011

(54) PERMITTING MULTIPLE TASKS REQUIRING ELEVATED RIGHTS

(75) Inventors: Giles Edward van der Bogert, Renton, WA (US); John E. Brezak, Woodinville, WA (US); Jonathan D Schwartz, Kirkland, WA (US); Michael G. Sheldon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1042 days.

(21) Appl. No.: 11/276,220

(22) Filed: Feb. 17, 2006

(65) Prior Publication Data

US 2007/0198933 A1     Aug. 23, 2007

(51) Int. Cl.
  *G06F 7/04*    (2006.01)
  *G06F 12/14*    (2006.01)
(52) U.S. Cl. ............... 726/28; 726/21; 726/26; 726/27
(58) Field of Classification Search .............. 726/28, 726/2, 16, 17, 18
See application file for complete search history.

(56) References Cited

U.S. PATENT DOCUMENTS 6,609,198 B1 *   8/2003  Wood et al. .................. 713/155
6,931,546 B1 *   8/2005  Kouznetsov et al. ........... 726/23

OTHER PUBLICATIONS

Miller, Todd. "Sudo Manual (Man Sudo)." Jul. 11, 2004. web.archive. org/web/20040711020526/http://www.gratisoft.us/sudo/man/sudo. htm.*
Garrels, Machtelt . "Bash Guide for Beginners (Bash)." Mar. 26, 2004. <web.archive.org/web/20040507235610/tldp.org/LDP/Bash-Beginners-Guide/html/index.html>.*
Cooper, Mendel. "Chapter 20. Subshells." Advanced Bash-Scripting Guide. Feb. 7, 2005 <web.archive.org/web/20050207053907, www. tldp.org/LDP/abs/html/subshells.html>.*
Loosemore, Sandra. "The GNU C Library Reference Manual ." Utah CS Department. Apr. 9, 1993. Gnu. <http://web.archive.org/web/20000914161736/http://www.cs.utah.edu/dept/old/texinfo/glibc-manual-0.02/library_25.html>.*
"CoCreateInstance." MSDN. Apr. 13, 2005. Microsoft. <http://msdn. microsoft.com/en-us/library/ms886232.aspx>.*
Lutus, P.. "Bash Shell Programming in Linux (Bash Programming)." Arachonoid. Feb. 6, 2005. Microsoft. <http://web.archive.org/web/20050206101822/arachnoid.com/linux/shell_programming. html>.*
Miller, Jeff. "Using LUA/UAP in custom applicatons (ElevationMoniker)." MSDN. Jan. 27, 2006. MSDN. <http://social. msdn.microsoft.com/forums/en-US/windowssecurity/thread/d0a6e2f1-133e-4434-be81-135132a23b27>.*
"Developer Best Practices and Guidelines for Applications in a Least Privileged Environment. (Elevated Object)". Sep. 2005. MSDN. <http://web.archive.org/web/20051218013716/http://msdn.microsoft.com/windowsvista/default.aspx?pull=/library/enus/dnlong/html/AccProtVista.asp>.*

(Continued)

*Primary Examiner* — Kambiz Zand
*Assistant Examiner* — Imhotep Durham
(74) *Attorney, Agent, or Firm* — Lee & Hayes, PLLC

(57) ABSTRACT

System(s), method(s), and/or technique(s) ("tools") are described that enable a user to permit multiple tasks requiring elevated rights with as little as one rights elevation. For example, the tools may enable an installation wizard operating within a limited-rights context to perform multiple tasks that require a higher-rights context with a single rights elevation by the user. The tools may do so using an object agent, an instance of which may be created by the installation wizard following a single rights elevation. This instance of the object agent then creates instances of other objects without requiring that the user elevate his or her rights. These other objects' instances may then run the tasks that require the higher-rights context.

8 Claims, 4 Drawing Sheets

OTHER PUBLICATIONS

"Getting Started with User Account Protection on Windows Vista Beta." Microsoft Technet. Jan. 14, 2005. Microsoft. <http://web.archive.org/web/20060104131044/http://www.microsoft.com/technet/windowsvista/evaluate/feat/uaprot.mspx>.*

Application Programming Interface, System Administrator. In Microsoft Computer Dictionary. Microsoft Press 2002.*

"Linux/Unix Command Library." About, Inc. Exec. Jan. 11, 2006. http://web.archive.org/web/20060111054657/http://linux.about.com/od/commands/l/blcmdl3_exec.htm Popen. Sep. 18, 2005. http://web.archive.org/web/20050918003713/http://linux.about.com/library/cmd/blcmdl3_popen.htm System. Sep. 24, 2005. http://web.archive.org/web/20050924203516/http://linux.*

Habraken, Joe. Novell Linux Desktop 9 User's Handbook. Novell Press, 2005. 32-34, 151-153. Print.*

Dulaney, Emmett. Novell Linux Desktop 9 Administrator's Handbook. Novell Press, 2005. 59, 199, and 235. Print.*

* cited by examiner

PERMITTING MULTIPLE TASKS REQUIRING ELEVATED RIGHTS

BACKGROUND

Generally, two types of accounts are used to log a user on to a computer's operating system. One has nearly unlimited rights, often called an administrator account, the other has limited rights, often called a standard user account. Standard user accounts permit some tasks but prohibit others, such as installing an application or altering the computer's system settings. Administrator accounts, on the other hand, generally permit most if not all tasks.

Not surprisingly, many users log on to their computers with administrator accounts so that they may do nearly whatever they want. But there are significant risks involved in using administrator accounts. Malicious code may perform whatever tasks are permitted by the account currently in use, such as installing and deleting applications and files—potentially highly damaging tasks. This is because most malicious code performs its tasks while impersonating the current user of the computer—thus, if a user is logged on with an administrator account, the malicious code may perform dangerous tasks permitted by that account.

To reduce these risks, a user may instead logon with a standard user account. Logging on with a standard user account may reduce these risks because is the standard user account may not have the right to permit malicious code to perform many dangerous tasks. If the standard user account does not have the right to perform a task, the operating system may prohibit the malicious code from performing that task. For this reason, using a standard user account may be safer than using an administrator account.

If a user is using a standard user account he or she may still perform tasks requiring higher rights by elevating his or her rights when needed for a particular task. Assume, for example, that a user wants to install a video card on his or her computer. To do so, the video card needs to run an installation wizard. This wizard uses two tasks, each of which requires administrator rights. To allow the wizard to install the video card, the user will typically need to elevate his or her rights for the first task and then elevate his or her rights again for the second task.

SUMMARY

System(s), method(s), and/or technique(s) ("tools") are described that enable a user to permit multiple tasks requiring elevated rights with as little as one rights elevation. For example, the tools may enable an installation wizard operating within a limited-rights context to perform multiple tasks that require a higher-rights context with a single rights elevation by the user. The tools may do so using an object agent, an instance of which may be created by the installation wizard following a single rights elevation. This instance of the object agent then creates instances of other objects without requiring that the user elevate his or her rights. These other objects' instances may then run the tasks that require the higher-rights context.

This Summary is provided to introduce a selection of concepts in a is simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes tools capable of enabling a user to permit multiple tasks requiring elevated rights with as little as one rights elevation. This may improve a user's experience by reducing how many times he or she needs to elevate his or her rights. Reducing how many times users elevate their rights may also improve security because users are less likely to be desensitized. When users become desensitized to elevating their rights they may elevate without considering the consequences.

An environment in which the tools may enable these and other actions is set forth below in a section entitled Exemplary Operating Environment. This section is followed by another describing exemplary ways in which the tools build object agents, entitled Building an Exemplary Object Agent. Another section follows and describes exemplary ways in which the tools use an object agent to enable a user to permit multiple tasks requiring elevated rights with as little as one rights elevation. This section is entitled Using an Exemplary Object Agent. The overview, section titles, and summaries are provided for the reader's convenience and are not intended to limit the scope of the claims or the entitled sections.

Exemplary Operating Environment

Before describing the tools in detail, the following discussion of an exemplary operating environment is provided to assist the reader in understanding ways in which various inventive aspects of the tools may be employed. The environment described below constitutes but one example and is not intended to limit application of the tools to any one particular operating environment. Other environments may be used without departing from the spirit and scope of the claimed subject matter.

Figure 1:
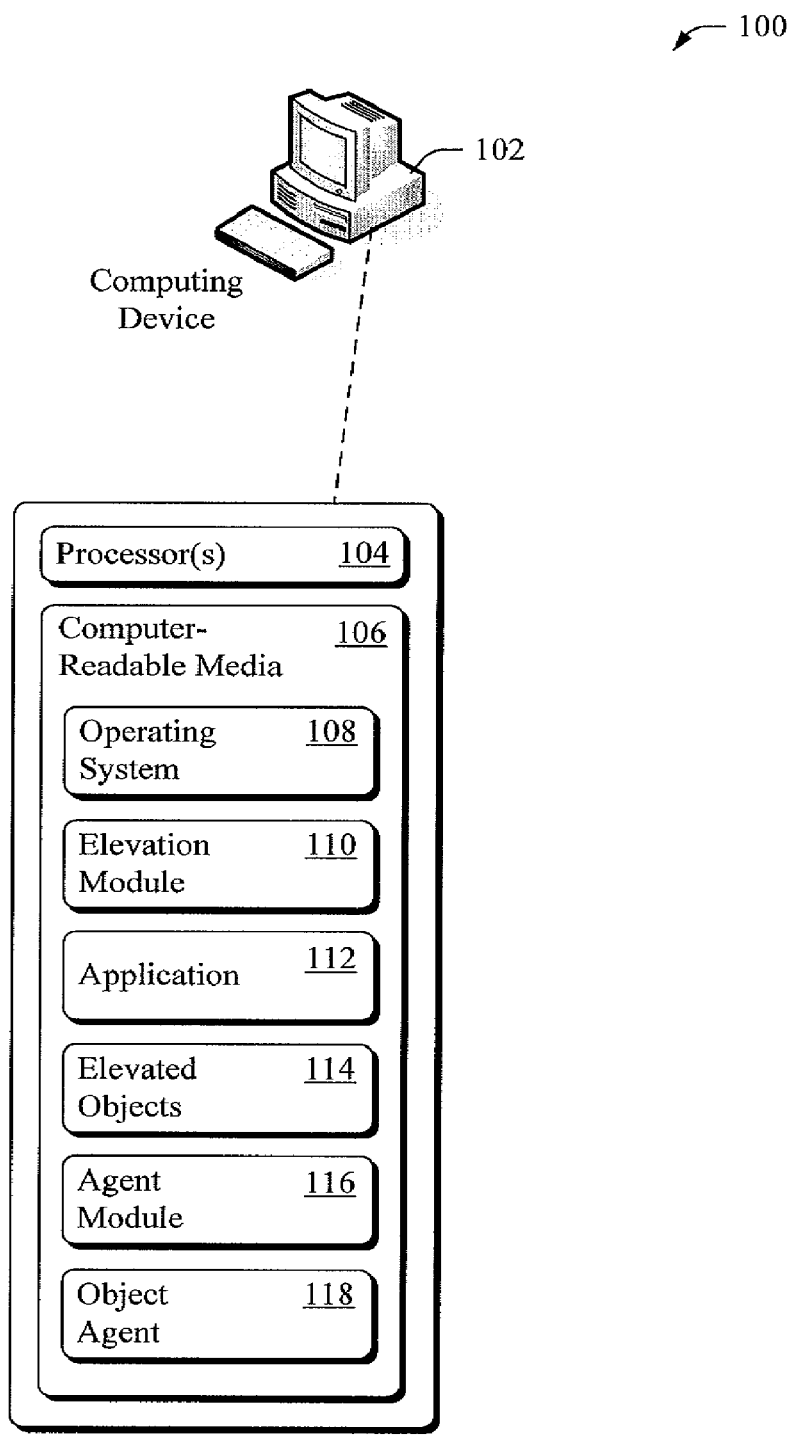
FIG. 1 illustrates an exemplary operating environment in which various embodiments of the tools may operate.

FIG. 1 illustrates one such operating environment, in accordance with one embodiment, generally at 100 comprising a computing device 102 having one or more processor(s) 104 and computer-readable media 106. The computing device is shown with a desktop computer icon but may be another type of computing device, such as a smart phone, laptop, or personal digital assistant. The processors are capable of accessing and/or executing the computer-readable media. The computer-readable media comprises or has access to an operating system 108, an elevation module 110, an application 112, elevated objects 114, an agent module 116, and an object agent 118.

The operating system is capable of managing the rights contexts of various processes operating or capable of operating on the computing device, as will be appreciated by the skilled artisan. When a user logs on with an account that does not have unlimited rights in a particular context where elevated rights would be useful, the operating system may use the elevation module to enable the user to elevate his or her rights. For example, if a user logs on with an account having limited rights (e.g., a standard user account) or multiple tiers of rights (e.g., an account capable of higher rights, such as administrator-level rights, but currently using a filtered token with limited rights), certain tasks may not be permitted. To permit the task, the elevation module provides, in accordance with one embodiment, a user interface enabling the user to elevate his or her rights. A user may select to raise the rights context from a limited-rights tier to a higher-rights tier of a multi-tiered account for a particular task. Alternately or additionally, a user may enter credentials to use another account having higher rights to perform a particular task.

The computer-readable media also comprises the application, which may operate within a limited-rights context. The application may use multiple tasks needing a higher rights context than those in which the application operates (each an "elevated task"). These elevated tasks can be distinct from each other, and in this example, each is associated with one of the elevated objects. In this particular example, each elevated task may be a distinct piece of code that may require higher rights to succeed.

In the illustrated and described embodiment, instances of each of the elevated objects are each capable of performing an elevated task if each is operating within a sufficiently high rights context. These instances may be created by the application with an Elevation Moniker (EM) call. The Elevation Moniker call is a public API. In some cases, a Co create instance As Administrator (a CCIaa) call may be made to create and use an Elevation Moniker. Each Elevation Moniker call may require that the elevation module receive the user's assent to elevate his or her rights for each of the elevated objects if the process from which the Elevation Moniker call is called has insufficient rights. These elevated objects may be generally available or custom-built. An instance of each may also be created using parameters particular to each.

The application may instead create an instance of the object agent, however. This instance of the object agent may be created, in some cases, with a single Elevation Moniker call enabling the user to interact with a single elevation process. The single elevation process may comprise a single dialog enabling a user action (e.g., selecting a button or entering credentials) or a more complex user interface having multiple user interactions.

As set forth below, each of these elevated objects may be a COM object, an instance of which is created by the object agent with a CoCreateInstance (CCI) call, as will be appreciated by the skilled artisan. The object agent may use a CCI call, which does not require that the elevation module receive the user's assent to elevate his or her rights, because the object agent resides in an equivalent or higher rights context.

The agent module is capable of building the object agent and will be described in greater detail as part of flow diagram 200 set forth below.

Building an Exemplary Object Agent

The following discussion describes exemplary ways in which the tools build an object agent in accordance with one embodiment. This discussion refers to particular elements, such as elements of operating environment 100 of FIG. 1, though other elements and environments may be used.

When a programmer builds a software application that uses elevated tasks, the programmer may use elevated objects capable of performing those tasks. Instances of these elevated objects are created by the software application when the software application is executed. These instances then perform the elevated tasks.

For example, if a programmer wants to build an installation wizard application for installing a video card, the programmer may need distinct elevated tasks. One task may be to change a computing device's display settings. Another task may be to write display configuration information to the computing device's system registry. The programmer may build the installation wizard such that it creates instances of elevated objects capable of performing these tasks, such as a display-settings object and a system-registry configuration object.

These tasks and their associated objects, however, may use a high level of rights, such as administrator-level rights or rights granted by a middle or top tier of a multi-tiered account. To create an instance of each of these objects, the user may then need to elevate his or her rights for each object. If an application needs to create instances of many different elevated objects the user may have to elevate is many times, which is disruptive.

The tools described above and below enable a programmer to build an object agent. An instance of this object agent can create instances of elevated objects needed by an application. In one embodiment, for example, an instance of the object agent is created with a single rights elevation after which multiple elevated objects are created via the object agent instance without additional rights elevations. In this embodiment one elevation is used to create the instance of the object agent rather than one elevation for each elevated object.

Figure 2:
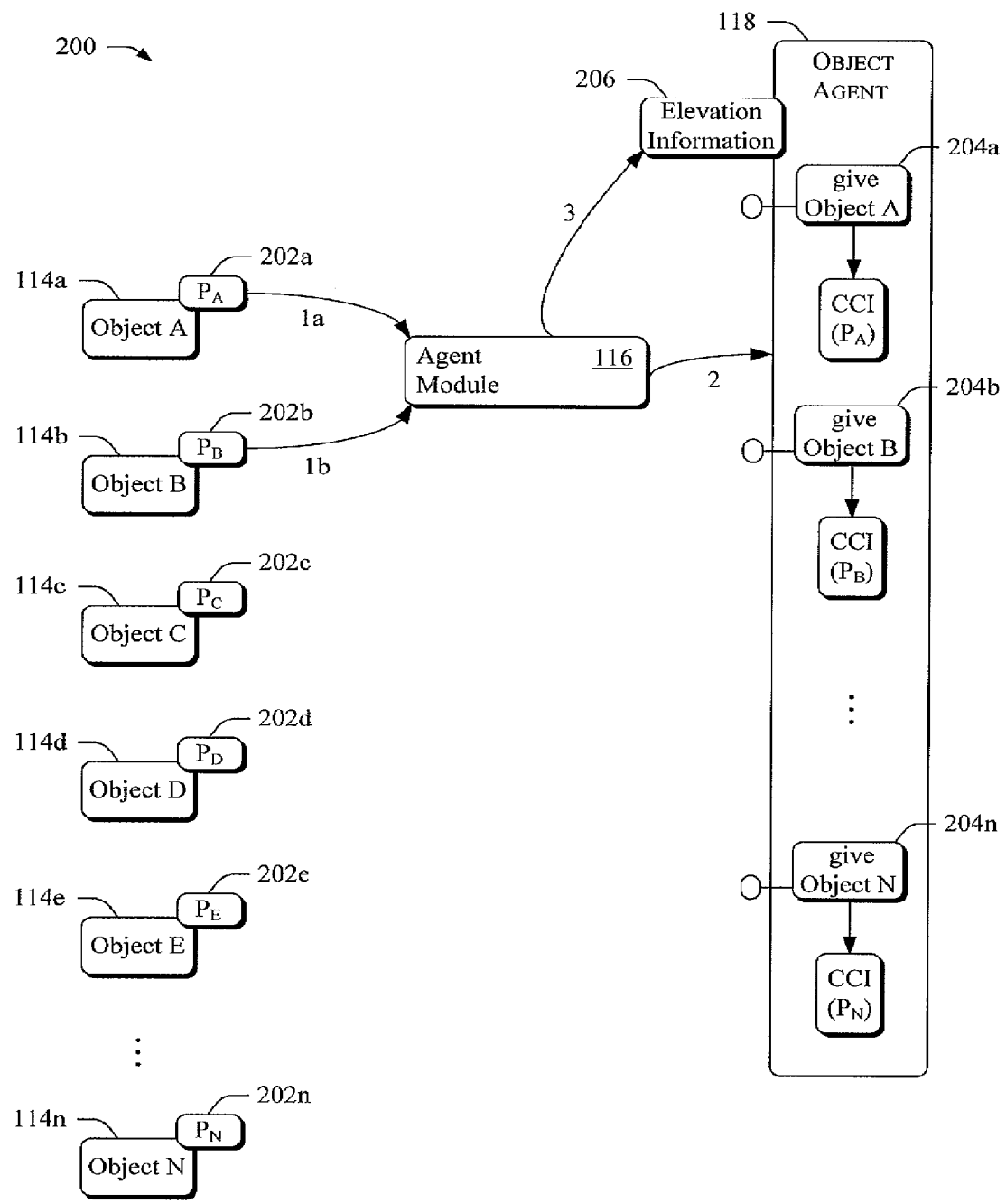
FIG. 2 shows an exemplary flow diagram with actions and/or communications between elements of FIG. 1 and illustrating some ways in which the tools may build an object agent in accordance with one embodiment.

FIG. 2 shows an exemplary flow diagram 200 illustrating some ways in which the tools may build an object agent. The flow diagram can be implemented in any suitable environment, with the environment of FIG. 1 serving as but one example of such an environment. In the context of the environment of FIG. 1, however, FIG. 2 illustrates actions by, and accompanying communications between, elements of environment 100. The actions and accompanying communications are marked with arrows. This flow diagram may be implemented in any suitable hardware, software, firmware, or combination thereof In the case of software and firmware, this diagram represents sets of operations implemented as computer-executable instructions.

At arrows 1*a* and 1*b*, agent module 116 receives selection of elevated objects 114*a* and 114*b*, here with parameters 202*a* and 202*b* associated with these elevated objects 114*a* and 114*b*, respectively. Parameters 202*a* through 202*n* are capable of indicating which elevated object 114*a* through 114*n* is which, such as information sufficient for an instance of each elevated object 114 to be created separately. These parameters and elevated objects may be created by a programmer from which they are received, may be generally available, or may be exposed by the tools and then selected by the programmer.

A programmer of the installation wizard mentioned above, for example, may select an elevated object (e.g., through a graphical user interface that in turn provides parameters for each, or directly with the parameters) that is capable of changing a computing device's display settings and selecting another elevated object capable of writing display configuration information to a computing device's system registry. These elevated objects and their parameters are illustrated in part in FIG. 2. Elevated object 114*a* is a display-setting elevated object ("Object A") and elevated object 114*b* is a system-registry configuration elevated object ("Object B"). These have parameters "$P_A$" and "$P_B$" shown at 202*a* and 202*b*, respectively.

Parameters 202*c*, 202*d*, 202*e*, through 202*n* for other elevated objects 114*c*, 114*d*, 114*e*, through 114*n*, respectively, may also be received by the agent module (not shown). A programmer may select many different elevated objects to perform many different elevated tasks, such as an arbitrary number of parameters (up to "n" number of parameters) for an arbitrary number of elevated objects (up to "n" objects).

At arrow 2, the agent module builds object agent 118. An instance of the object agent may later be called by an application operating within a limited-rights context in which elevated tasks associated with elevated objects in the object agent may not be performed. The instance of the object agent may then be created within a higher-rights context in which the elevated objects and their tasks may be performed. As noted above, the instance of the object agent may be created with a single Elevation Moniker call or otherwise be created following a single rights elevation process by the user.

In at least some embodiments, the object agent may have an undefined or arbitrarily large number of slots with which an object may be created. This is shown in part with methods 204a, 204b, through 204n. Each of these methods is capable, when executed within an appropriate rights context, of creating instances of elevated objects that are capable of performing their associated elevated tasks.

The agent module may build these methods capable of creating instances of objects through CCI calls using received parameters, such as the illustrated "$P_A$", "$P_B$", and "$P_N$". Here we assume that two parameters were received and two methods built for Object A and Object B.

At arrow 3, the agent module may associate rights-elevation information 206 with the object agent. This information may be received from a programmer and used by elevation module 110 to inform a user about the elevated tasks enabled by the object agent. In some cases a programmer groups elevated objects into the object agent based on their general theme or a theme that the user may understand.

In the installation wizard example, for instance, the programmer of the installation wizard may provide text indicating that the user is being requested to elevate his or her rights in order to alter a display for the new video card. This may provide additional security for the computing device and its user. If malicious code were to attempt to create an instance of the object agent in a higher-rights context, the elevation module may provide this information. This information would indicate that the user is being asked to elevate his or her rights to alter a display. But if that malicious code has nothing to do with altering the computing device's display (e.g., the user thought that the malicious code was to play music or open a spreadsheet document) the user may be tipped off and not elevate his or her rights. Thus, the tools enable additional security through context provided by a person that provides the parameters specifying the elevated objects for a given object agent.

In at least some embodiments, the agent module may also only permit a person to build an object agent if they are trusted (e.g., are the computing device's local administrator) or are most trusted (e.g., information from them may not be repudiated), which may tinter improve security. One way in which to do this is to receive parameters and elevation information within a higher-rights context. Elevation information received from a trusted or most-trusted source may then be deemed trusted, which the elevation module may indicate to a user as part of a rights-elevation process. The elevation information may also comprise, in some cases, untrusted information, such as showing a path name of a non-signed binary when the non-signed binary is being executed.

Using an Exemplary Object Agent

The following discussion describes exemplary ways in which the tools use an object agent to enable a user to permit tasks requiring elevated rights with as little as one rights elevation in accordance with one embodiment. This discussion refers to particular elements, such as elements of operating environment 100 of FIG. 1, and continues the example of the installation wizard described above, though other elements and applications may be used.

Figure 3:
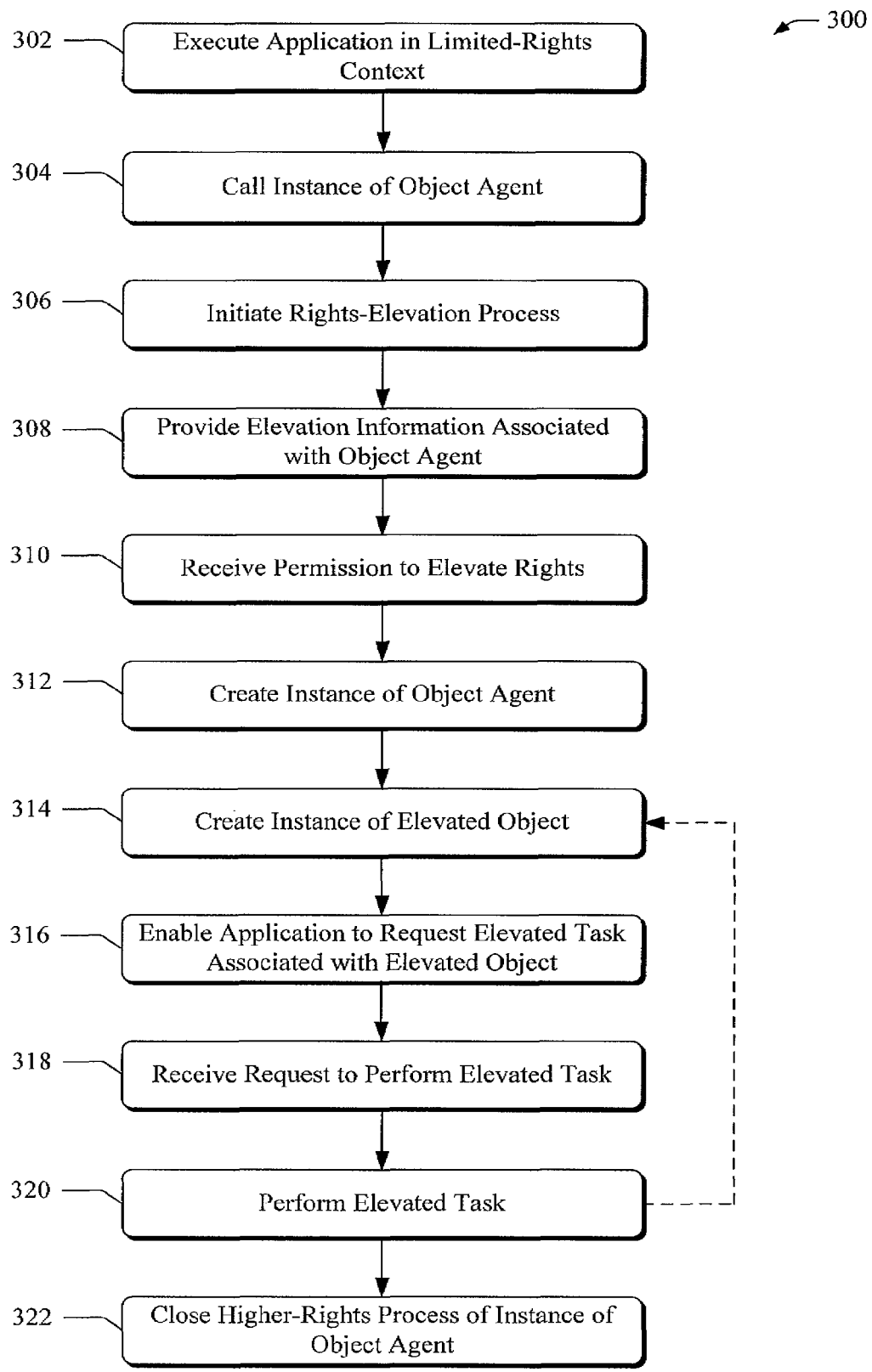
FIG. 3 is an exemplary process illustrating some ways in which the tools use an object agent in accordance with one embodiment.

FIG. 3 is an exemplary process 300 illustrating some ways in which the tools may use an object agent in accordance with one embodiment. This process is illustrated as a series of blocks representing individual operations or acts performed by elements of operating environment 100 of FIG. 1, such as application 112 and object agent 118. This process may be implemented in any suitable hardware, software, firmware, or combination thereof; in the case of software and firmware, this process represents a set of operations implemented as computer-executable instructions stored in computer-readable media and executable by one or more processors.

Block 302 executes an application within a limited-rights context. The application can require performance of distinct tasks not permitted within the limited-rights context. Object agents may be used by different applications or reused by the same application. In some cases multiple applications operating in various rights contexts may use instances of the object agent and at the same or different times. One application operating within a standard user account may use an instance of the object agent while another application operating in limited-rights tier of a multi-tiered account may use another instance of the object agent.

Here the installation wizard application, for example, may be executed within a process having limited rights not permitting the installation wizard to change a computing device's display settings or write display configuration information to the computing device's system registry.

Figure 4:
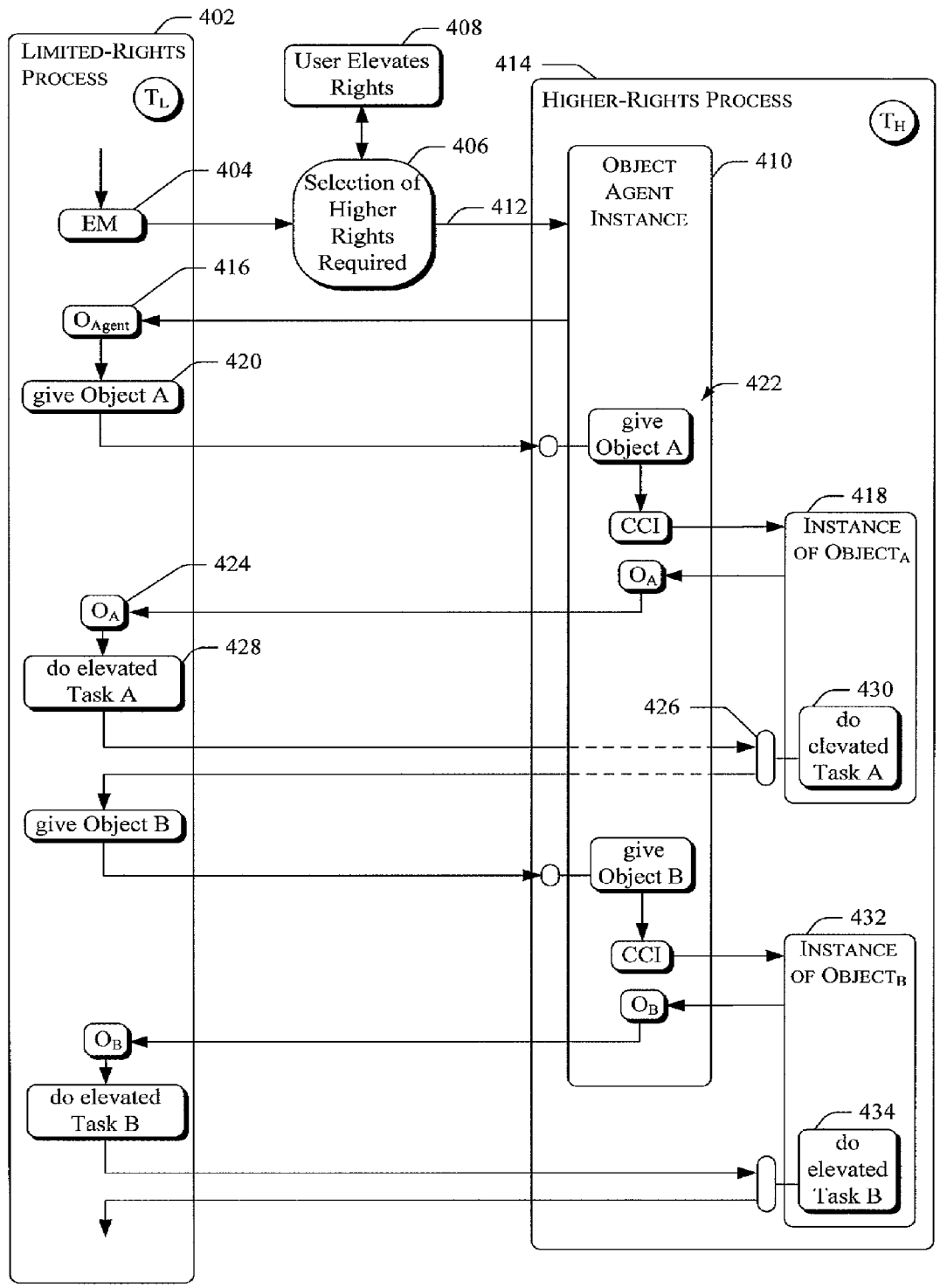
FIG. 4 shows exemplary limited- and higher-rights processes in which an example application and an instance of an object agent may operate, respectively, in accordance with one embodiment.

FIG. 4 shows exemplary limited-and higher-rights processes in which the application and an instance of the object agent may operate, respectively, in accordance with one embodiment. The installation wizard operates within an exemplary limited-rights process 402. This particular limited-rights context is based on a limited-rights tier of a user's multi-tiered account and is marked with a "$T_L$" (a limited-rights token).

Block 304 calls an instance of an object agent. For this call to be successful, a user may need to elevate his or her rights, though this elevation may be limited to the object agent and tasks it enables. Here the installation wizard calls the exemplary object agent 118 shown in FIG. 3 with an Elevation Moniker call, shown in FIG. 4 at 404 (marked "EM").

Block 306 initiates a rights-elevation process by which a user may elevate his or her rights to permit creation of the instance of the object agent. The rights elevation process may use a dialog box with a single button to select elevation, a data-entry field for entry of credentials, a biometric scanning device for entry of authenticating biological credentials, or other techniques.

Block 308 provides elevation information associated with the object agent. This elevation information may be trusted. It may also indicate to a user what kind of tasks elevating his or her rights will permit. Here object agent 118 of FIG. 2 provides elevation information 206 to elevation module 110 of FIG. 1. This elevation information 206 indicates that the object agent intends to alter the computing device's display settings. Here the elevation module presents this elevation information within the single dialog box to inform the user as to what type of tasks the user will be permitting by elevating his rights. This is indicated in FIG. 4 at 406.

Block 310 receives permission to elevate rights to a level sufficient to create an instance of the object agent and permit its elevated tasks. Here the user selected a button to raise his or her rights-tier responsive to reading that the rights elevation is to change display settings. Receiving permission from the user is indicated in FIG. 4 at 408.

Block 312 creates an instance of the object agent. The instance may be created responsive to a user elevating his or her rights just once, as described above. Here the user wishes to install the video card, sees a dialog to elevate rights, reads that the elevation is for display settings (which is related to the installation wizard and what the user wants), and selects to elevate rights for this indicated purpose. Responsive to this, the tools create an instance 410 of object agent 118 of FIG. 2. This creation is shown with an arrow at 412.

The tools create the instance of the object agent within a rights context capable of permitting elevated tasks needed by the application. Here FIG. 4 shows the instance 410 executing within a higher-rights process 414. The higher-rights process is based on permission received by the user's elevation at block 310. This particular higher-rights context is based on a higher-rights tier of the user's multi-tiered account and shown with a "$T_H$" (a higher-rights token).

Note that the user's elevation of rights is not universal or permanent. The application, for instance, remains operating within the limited-rights context. Other, unrelated applications may also remain in their limited-rights contexts. Also, the higher-rights process may close after performing the elevated tasks.

Block 312 may also communicate that the object agent instance has been created and enable the application to communicate with the object agent (e.g., to create instances of elevated objects). This is shown with "$O_{Agent}$" 416 in FIG. 4.

Block 314 creates an instance of an elevated object. The instance of the object agent created at block 312 may create elevated objects and enable each of them to be called to perform an associated task. Here the object agent instance creates an instance 418 of Object A from FIG. 2 responsive to the application asking for Object A with "give Object A" at 420. The object agent creates the instance of Object A using a method that gives Object A and makes a CCI call not requiring a rights elevation. This is shown at 422 in FIG. 4.

Block 316 enables the application to request that an elevated task associated with the elevated object be performed. Here this is shown at 424 with "$O_A$".

Block 318 receives a request to perform an elevated task. Here a method 426 of instance 418 receives a request 428 from the installation wizard operating within the limited-rights process. The request is shown with "do elevated Task A" and its outbound arrow to method 426.

Block 320 performs the elevated task within a higher-rights context. This elevated task may be enabled by the instance of the elevated object associated with the elevated task. Here instance 418 of Object A, as described above, alters display settings within the higher-rights process for the installation wizard. This is shown with "do elevated Task A" in Object A at 430.

Blocks 314 through 320 may be performed again for as many elevated objects as are in the object agent, shown with a dashed arrow in FIG. 3. Here blocks 314 through 320 are performed effective to perform elevated Task B through an instance 432 of Object B effective to write display configuration information to the computing device's system registry (shown with "do elevated Task B" at 434).

Block 322 closes the higher-rights process in which the instance of the object agent operates following performance of the elevated tasks enabled by the object agent. Here the higher-rights process closes after the task writes display configuration information to the computing device's system registry and prior to the installation wizard closing.

Conclusion

The above-described systems, methods, and/or techniques enable a user to permit multiple tasks requiring elevated rights with as little as one rights elevation. This may improve a user's experience and security by reducing how many times he or she needs to elevate his or her rights.

Although the systems and methods have been described in language specific to structural features and/or methodological acts, it is to be understood that the systems, methods, and techniques defined in the appended claims are not necessarily limited to the specific features or acts described. Rather, the specific features and acts are disclosed as exemplary forms of implementing the claimed systems, methods, and techniques.

The invention claimed is:

1. A method for permitting multiple tasks requiring elevated rights implemented at least in part by a computing device, the method comprising:
   receiving selection of multiple objects, each of the multiple objects performing at least one of multiple tasks requiring a higher-rights context;
   building an object agent for creating the multiple objects;
   calling an object agent instance of the object agent by an application operating within a limited-rights context;
   displaying elevation information indicating a description for each of the multiple tasks;
   displaying a single selector for a user to select elevation;
   enabling the user to determine whether to select elevation based on the elevation information; and
   when the user has selected elevation via the single selector:
      creating the object agent instance;
      communicating, by the object agent instance to the application, when the object agent instance has been created;
      creating, by the object agent instance, multiple object instances of the multiple objects; and
   operating, by the object agent instance and the multiple object instances, within the higher-rights context to impermanently enable the application to perform the multiple tasks utilizing the higher-rights context.

2. The method of claim 1, wherein at least one of the multiple object instances are created with a CoCreateInstance (CCI) call.

3. The method of claim 1, wherein each of the at least one of the multiple tasks is performed by a distinct piece of code.

4. The method of claim 1, further comprising receiving the elevation information within the higher-rights context.

5. One or more computer-readable media, that does not include a propagated carrier wave signal, having computer-readable instructions stored thereon for execution by a processor of a computing device that, when executed by the computing device, cause the computing device to perform acts comprising:
   receiving selection of multiple objects, each of the multiple objects performing at least one of multiple tasks requiring a higher-rights context;
   building an object agent for creating the multiple objects;
   calling an object agent instance of the object agent by an application operating within a limited-rights context;
   displaying elevation information indicating a description for each of the multiple tasks;
   displaying a selector for a user to select elevation;
   enabling the user to determine whether to select elevation based on the elevation information;

when the user has selected elevation via the selector:
  creating the object agent instance;
    communicating, by the object agent instance to the application, when the object agent instance has been created;
    creating, by the object agent instance, multiple object instances of the multiple objects; and
  operating, by the object agent instance and the multiple object instances, within the higher-rights context to impermanently enable the application to perform the multiple tasks utilizing the higher-rights context.

6. The one or more computer-readable media claim 5, wherein at least one of the multiple object instances are created with a CoCreateInstance (CCI) call.

7. The one or more computer-readable media claim 5, wherein each of the at least one of the multiple tasks is performed by a distinct piece of code.

8. The one or more computer-readable media claim 5, further comprising receiving the elevation information within the higher-rights context.

* * * * *